(No Model.)

A. VUILLIER.
Cover for Milk Cans.

No. 240,790. Patented April 26, 1881.

WITNESSES
Charles R. Searle.
Edw. D. Stafford.

INVENTOR
Aimé Vuillier
by his attorney
Thomas D. Stetson

UNITED STATES PATENT OFFICE.

AIMÉ VUILLIER, OF PORTLAND, CONNECTICUT, ASSIGNOR TO THE UNITED STATES STAMPING COMPANY, OF SAME PLACE.

COVER FOR MILK-CANS.

SPECIFICATION forming part of Letters Patent No. 240,790, dated April 26, 1881.

Application filed November 19, 1880. (No model.)

*To all whom it may concern:*

Be it known that I, AIMÉ VUILLIER, a citizen of the United States, residing at Portland, Middlesex county, in the State of Connecticut, have invented certain new and useful Improvements in the Manufacture of Covers for Milk-Cans and Analogous Articles, of which the following is a specification.

The peculiarities relate to the manufacture and to the article produced. I can employ tinned sheet iron or steel as the material.

The cover is formed in two parts—the downwardly-projecting tapering ring or body and the cap. I produce the tapering ring by forming in dies, from a suitable sheet of metal, a cup-shaped vessel of proper dimensions to fill the neck of a milk-can, and by cutting out or otherwise removing the bottom and the outwardly-projecting flange at the upper edge. I have then a tapering ring, of the proper size and shape, formed without a seam. To finish the cover, I solder this tapering ring to the cap in the ordinary manner. A cover thus formed avoids the soldering of the ordinary upright seam, and, as will be obvious, from the smooth surface of the body, fits closer than a cover made in the usual manner.

The following is a description of what I consider the best means of carrying out my invention.

The accompanying drawings form a part of this specification.

Figure 1:
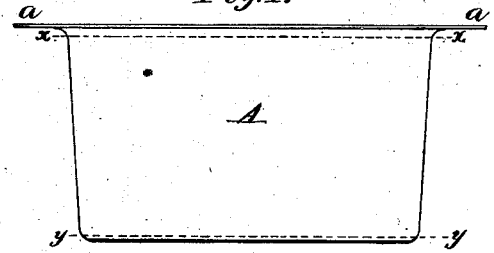
Figure 2:
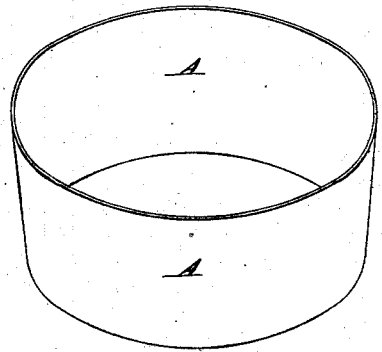
Figure 3:
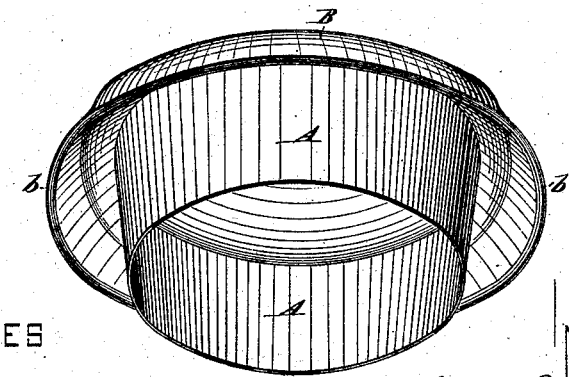

Figure 1 is an elevation of the tapered cup as it comes from the dies, previous to cutting off the surplus metal. Fig. 2 is a perspective view of the finished body before attaching the cap. Fig. 3 is a similar view of the finished cover from below.

Similar letters of reference indicate like parts in all the figures.

I believe it practicable to work with any ordinary kind or quality of sheet metal, but esteem it preferable, for some reasons, to use low steel rolled to the proper thickness and tinned.

The sheet metal is first cut by dies or otherwise into a circular form sufficiently large to allow the edge to be held firmly by the dies while the middle portion is drawn into the slightly-conical cup form required. The upper edge of the body A, with its projecting lip $a$, is then cut on the line $x\ x$, Fig. 1, and the bottom cut out or otherwise removed on the line $y\ y$. The tapering ring A is soldered by its upper edge firmly to the cap B, formed with the overhanging lip $b$, in the ordinary manner. The part which fits down tightly into the neck of the can (not shown) is seamless and of the desired taper, exactly stopping the mouth of the can. Thus I am enabled to obtain at little expense and trouble a tight-fitting cover of exact proportions.

I claim as my invention—

1. A cover formed of the cap B and seamless tapering drawn sheet-metal ring A, secured together, and adapted to serve substantially as herein specified.

2. The process of forming can-covers herein described, consisting in drawing a tapering cup from one piece of sheet metal, cutting out the center or flat portion thereof, and attaching the tapering ring so formed to the top piece, substantially as herein specified.

In testimony whereof I have hereunto set my hand, at Portland, Connecticut, this 16th day of November, 1880, in the presence of two subscribing witnesses.

AIMÉ VUILLIER.

Witnesses:
   THEO. P. AUSTIN,
   WM. T. HUNTER.